Figure 1:
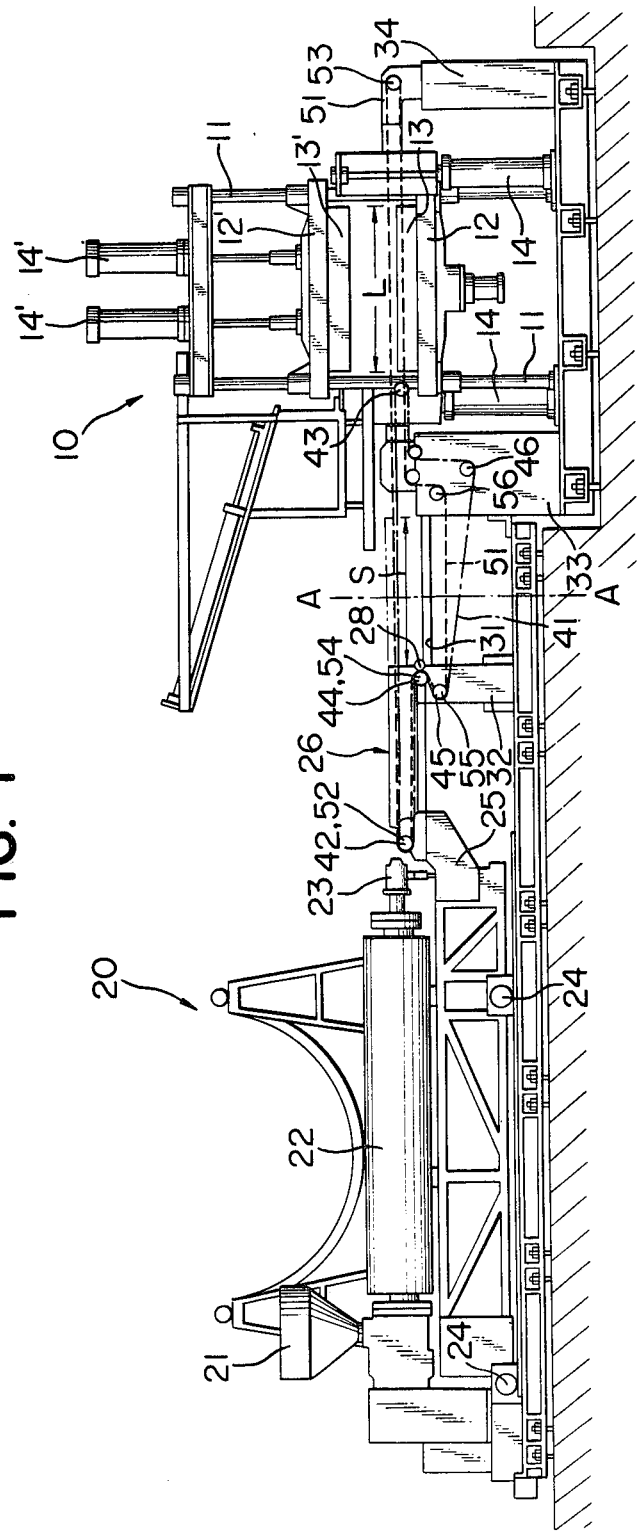

United States Patent [19]

Asano

[11] 4,150,930
[45] Apr. 24, 1979

[54] PLASTIC SHEET EXTRUDER COMBINED WITH FORMING MACHINE

[75] Inventor: Kazuo Asano, Nagoya, Japan

[73] Assignee: Kabushiki Kaisha Asano Kenkyusho, Nagoya, Japan

[21] Appl. No.: 861,949

[22] Filed: Dec. 19, 1977

[30] Foreign Application Priority Data

Dec. 31, 1976 [JP] Japan .................. 51/157943

[51] Int. Cl.² .............. B29C 3/06; B29D 7/02
[52] U.S. Cl. .................. 425/145; 425/327; 425/377; 425/397
[58] Field of Search .......... 425/145, 327, 376 R, 425/377, 394, 395, 396, 397; 264/280, 284, 323

[56] References Cited

U.S. PATENT DOCUMENTS

| 3,456,296 | 7/1969 | Schneider | 425/327 |
| 3,482,279 | 12/1969 | Anders et al. | 425/327 X |
| 3,883,631 | 5/1975 | Murray | 425/327 X |
| 4,086,045 | 4/1978 | Thiel et al. | 425/327 X |

Primary Examiner—Roy Lake
Assistant Examiner—Mark Rosenbaum
Attorney, Agent, or Firm—Thomas R. Morrison

[57] ABSTRACT

Apparatus for forming articles from the thermoplastic sheet is combined with a plastic sheet extruder for the purpose of producing articles efficiently and economically. Such forming machine is operated intermittently and periodically while the extruder continuously extrudes the plastic sheet so that it is necessary to provide any countermeasure for settling the discrepancy to be caused in the sheet movement. The countermeasure is provided by making the extruder longitudinally movable so that when the forming machine is in its molding operation where the opposed two dies thereof are engaged the extruder is retracted so as to receive the extruded plastic sheet on the carrier extended between the two for supplying the length of the plastic sheet to the forming machine in its unoperated position where the opposed dies are separated for receiving said supply therebetween.

10 Claims, 4 Drawing Figures

PLASTIC SHEET EXTRUDER COMBINED WITH FORMING MACHINE

The present invention relates generally to a thermoplastic sheet extruder combined with a molding machine to form articles from the sheet just extruded and consequently still in the plastic state, and more particularly to such combined apparatus comprising a countermeasure for settling the discrepancy in the sheet movement which is caused between the extruder continuously extruding the sheet and the forming machine to be intermittently operated for die cutting, trimming and forming the articles.

There have been provided various moldingly forming machines to produce various articles such as cups from a sheet of thermoplastic material. In general such machines have a pair of upper and lower dies relatively vertically movable between the separated die position or unoperated position where the heated and softened sheet is fed from a supply roll of plastic material sheet and the engaged die position or the molding position. When the dies are separated, the formed articles are ejected out of the machine before receiving a new supply of a length of the leading portion of the sheet. For feeding the sheet from the plastic sheet roll to the dies through the heater zone, there is generally provided an endless belt for carrying the sheet thereon and a pair of link chains each having a plurality of clamps for gripping the both sides of the sheet therebetween to be synchronizedly and periodically driven.

On the other hand, there have been provided also various thermoplastic sheet extruders which generally have a barrel provided with heater means for softening the material such as polyvinyl chloride, polystyrene, polyethylene, polypropylene and the like fed from a hopper, a screw mechanism for kneading and feeding the softened material, and a die head for continuously forming and extruding the longitudinally extending sheet. In addition such extruder is also generally provided with belt and chains carrier means continuously driven to run at a speed equal to the extrusion rate for continuously receiving the sheet extruded from the die head without causing any undesired snagging or sagging. The sheet is cooled and taken up for instance in the form of rolls. When the material is of fairly high hot flowability such as olefin plastic inclusive of polyethylene, polypropylene and the like and when the sheet to be produced is of fairly large width and relatively thin thickness, the problem of said sagging or any other deformation is important and particular consideration must be paid.

It is naturally desired for efficiently and economically producing articles from the plastic sheet to combine the sheet extruder and the forming machine of the types as referred to above so that the just extruded sheet is fed directly to the forming machine, whereby at least the necessity of reheating the sheet and double provision of endless belt and chains sheet carrier means can be avoided. This is impossible, however, without providing any countermeasure for settling the discrepancy in the sheet movement to be caused by the continuous extrusion of the sheet on one hand and the intermittent molding operation on the other hand.

It might be possible to solve said problem, when the thermoplastic material is of fairly low hot flowability and when the sheet is of fairly narrow width and relatively thick, for instance by providing a continuously driven sprocket, or roll, and an intermittently driven sprocket, or roll, operatively connected with the endless chain or belt for driving thereof, and further providing a pair of displacedly movable compensation sprockets, or rolls, so that a part of the run of the chain, or belt, extending between one of said compensation sprockets and said intermittently driven sprocket may be stopped to run during the molding operation by synchronizedly stopping to drive said intermittently driven sprocket, or roll, but the other part of the run is still continuously driven for receiving the sheet continuously extruded while lengthening said one part of the run by synchronizedly displacing said one compensation sprocket, or roll, but shortening said other part of the run by synchronizedly displacing said other compensation sprocket, or roll.

This is not satisfactory or rather impracticable due to that the soft sheet carried by said belt and/or chains is to be subjected to sagging or any other deformation when the compensation sprocket, or roll are displaced for lengthening or shortening the concerned length run thereof.

Thus it is a principal object of the present invention to provide a forming machine combined with the sheet extruder for efficiently and economically producing articles from the plastic sheet.

The other object of the invention is to provide the countermeasure for settling the discrepancy in the sheet length to be caused by continuous extrusion and intermittent molding operation so as to practically realize such combined apparatus.

The further object is to provide such combined apparatus without causing any undesirable sagging or deformation to be possibly resulted when the material is of fairly high hot flowability and when the sheet is of fairly large width and relatively thin.

Various other objects and advantages to be attained according to the invention will be appreciated by those skilled in the art when reading and studying the more detailed explanation to be made hereinafter in reference to a preferred embodiment illustrated in the accompanying drawing, in which;

FIG. 1 is a schematic side elevation of the combined apparatus according to the invention in which the longitudinally movable extruder is shown in its retracted position for compensating an excessive length of the plastic sheet still continuously extruded therefrom even when the forming machine is in its molding operation and consequently cannot receive a new supply of the plastic sheet leading portion, in which the forming machine is illustrated in its unoperated position merely for the sake of drawing clarification although it should correctly be in its molding position in relation to the extruder in the retracted position.

Figure 2:
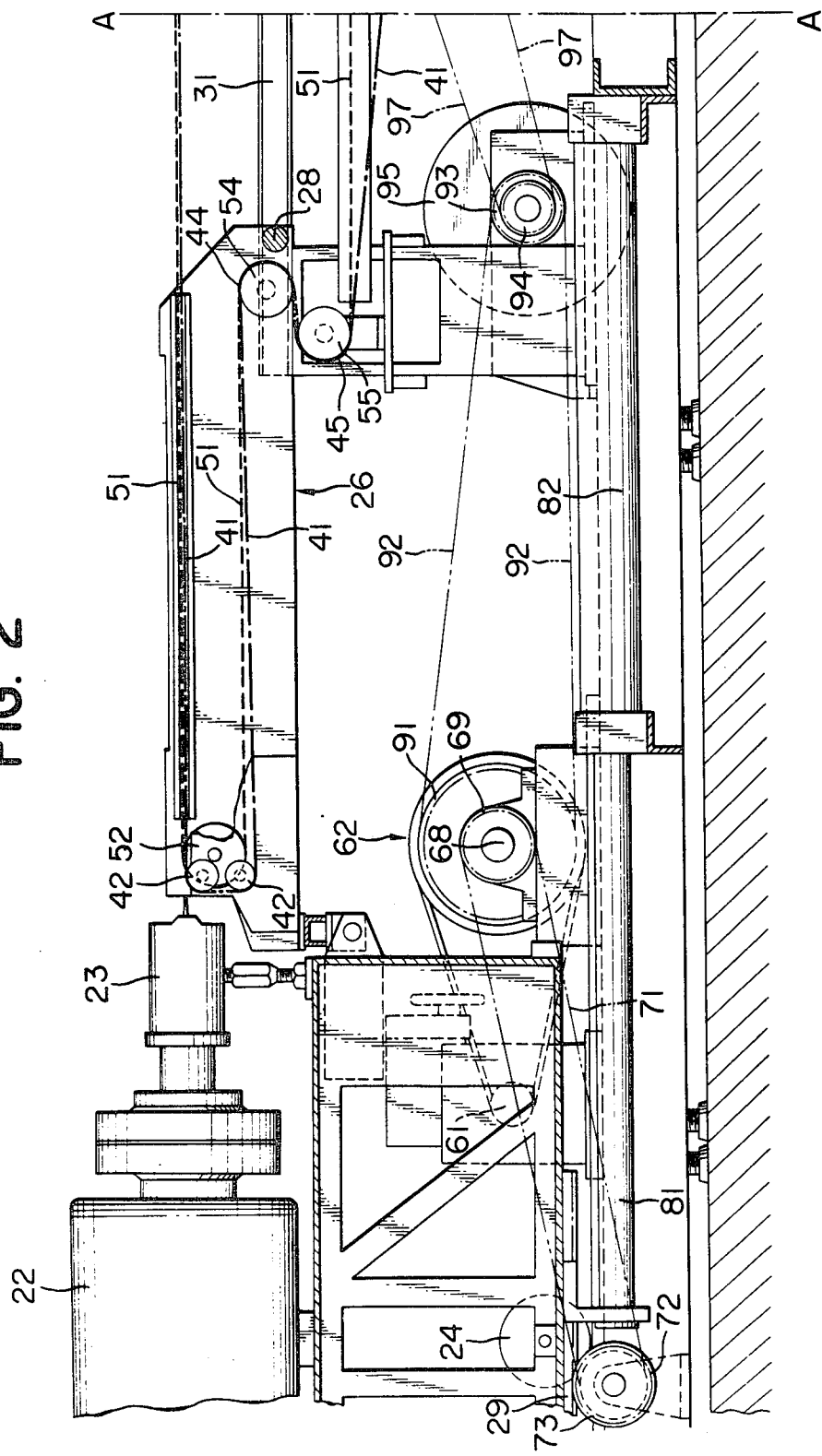
Figure 3:
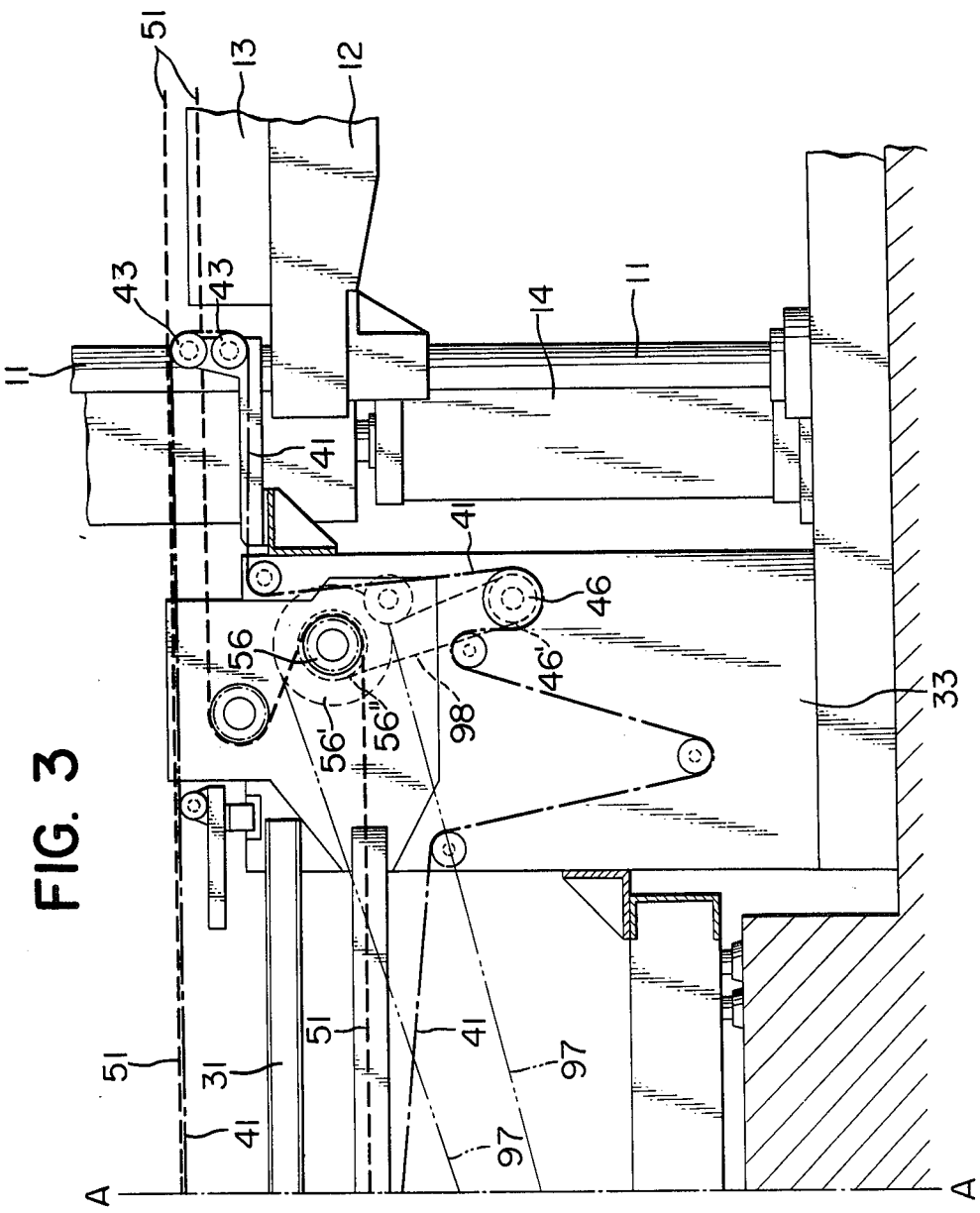
Figure 4:
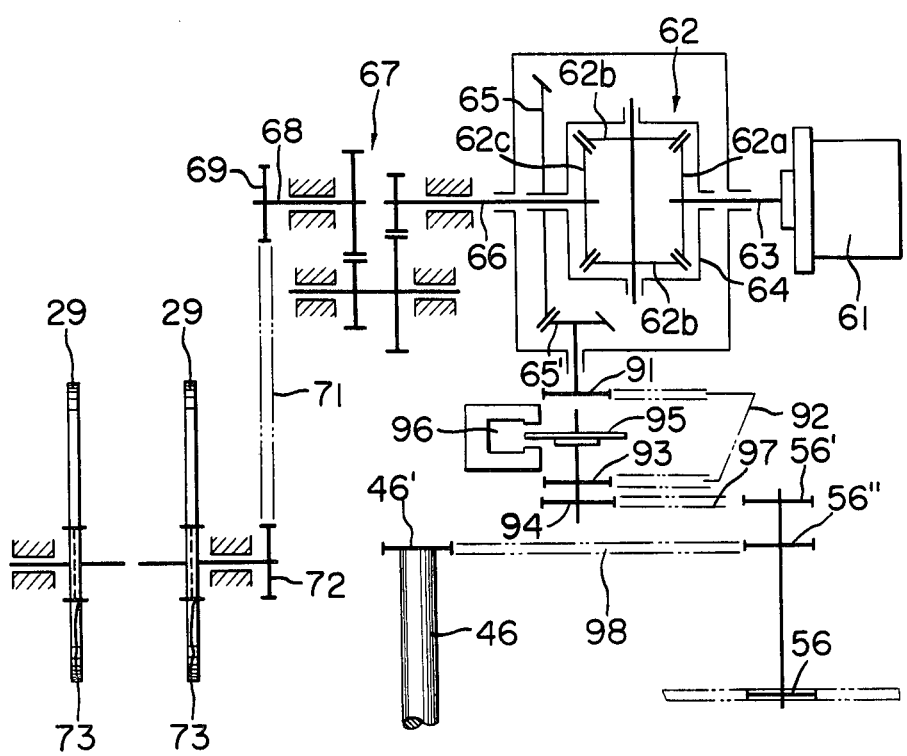

FIG. 2 is a fragmentary and diagrammatic side elevation in a larger scale of the left hand cut along the line A—A in FIG. 1 for showing the excessive sheet length compensation mechanism in relation to the extruder which is illustrated also in the retracted position, FIG. 3 is a fragmentary and diagrammatic side elevation of the right half cut along the line A—A in FIG. 1 for showing said compensation mechanism mainly in relation to the forming machine, and FIG. 4 is a diagram showing the transmission gearing system for driving the movable extruder and endless belt-chains synchronizedly with operation of the forming machine.

In reference to FIG. 1 generally explaining the apparatus according to the invention, there is shown on the right hand therein a forming machine represented generally by 10 which has four corner posts 11 each vertically standing and mounted on the machine base. Said corner posts 11 support a lower platen 12 fixedly mounted with a lower molding die 13 thereon and an upper platen 12' fixedly mounted with an upper molding die 13' therebeneath so as to be vertically movable guidedly therealong. The lower platen-die assembly 12-13 and the upper platen-die assembly 12'-13' are vertically moved by means of four hydraulic or pneumatic cylinder-piston devices 14 and 14' respectively so that the male and female dies 13, 13' are moved away from each other to be in the unoperated position as illustrated for receiving the leading end portion of the extruded sheet by a length of L necessary for forming the desired articles and toward each other to be engaged together for moldingly forming the desired articles.

There are various methods for forming articles from the thermoplastic sheet as well known by those skilled in the art. Since the invention does not have any connection with such methods themselves, however, the forming machine 10 may be of any of vaccum forming, pneumatic pressure forming and vacuum-pressure forming types, and it will not be necessary to explain the forming machine itself further in detail. It is added only that there is no need for providing any heating means for softening the plastic sheet since the just extruded sheet to be fed to the forming machine is still in the plasticized condition as referred to above.

On the left hand in FIG. 1, there is arranged a longitudinally movable extruder represented generally by 20 which has a hopper 21 for receiving and charging the thermoplastic material, an extruder barrel 22 housing a screw for kneading and feeding, material heater and the like (not shown), a sheet extrusion die head 23, and a plurality of wheels 24 for moving the extruder 20 as a whole along the rails laid on the machine base between the illustrated retracted position and the advanced position by a distance S a little shorter than said distance L by reason of that the extruder continuously extrudes the plastic sheet at a constant extrusion rate still during its forward movement.

The reciprocally movable extruder 20 has a forwardly projecting arm 25 at its forward end to which a longitudinally extended frame 26 is fixed at the rear end thereof. The frame 26 is of the width a little longer than the extruded sheet width and of the length substantially same with said length L. The frame 26 comprises a pair of right and left panels each having a roller 28 for guiding the frame 26 along a pair of rails 31 to longitudinally move together with the extruder 20. Said rails 31 are transversely spaced apart from each other and longitudinally extended between each of a pair of vertically standing posts 32 fixedly mounted on the machine base just below the forward end of said frame 26 when being in its retracted position as illustrated and each of a pair of vertically standing posts 33 fixedly mounted on the machine base just at the rear of the forming machine 10.

In order to transfer the extruded sheet from the extrusion die head 23 to the forming machine 10, an endless belt 41 of the width a little longer than the extruded sheet width is extended between a transversely elongated roll 42 mounted for rotation on the side panels of the frame 26 at the rear end thereof and consequently just below said extrusion die head 23 and a similarly transversely elongated roll 43 mounted for rotation just at the rear end of the lower die 13 of the forming machine 10. The upper running portion of the endless belt 41 must naturally be held in the strained condition, but the roll 42 mounted on the longitudinally movable frame 26 is to approach the roll 43 by the distance S when the extruder 20 and consequently the frame 26 is forwardly moved which results in slack of the endless belt 41 at a portion of the upper run thereof.

Various countermeasures for compensating such slack may be provided, but according to the preferred embodiment this may be avoided by providing an additional roll 44 mounted for rotation at the forward end of the movable frame 26 and a further additional roll 45 mounted for rotation on a pair of said posts 32 so as to be positioned below and preferably rearward of said first conpensation roll 44 when the frame 26 is in its retracted position. When the belt 41 is extended for drivingly connecting said departure roll 42, slack compensation roll 44, cooperative roll 45, terminus roll 43, and further a driving roll 46 transversely elongated and mounted between a pair of said posts 33 just rearward of the forming machine 10 to be driven by a prime mover through gearings to be explained in detail hereinafter, the forward movement of the extruder frame 26 causes the roll 44 mounted therein to be apart from the roll 45 mounted on the fixed posts 32 so that shortening of the upper run of the endless belt 41 caused by the extruder forward movement is compensated by corresponding lengthening of the belt lower run between the rolls 44, 45, and vice versa.

It is necessary to provide mechanism for delivering the plastic sheet beyond the terminus 43 of the running endless belt 41 to the article formation area between the upper and lower dies 13, 13'. For that purpose and further for correctly guiding the extruded sheet on the running belt 41, a pair of endless link chains 51 are extended, each carrying a plurality of plastic sheet gripping clamps and being rotatably mounted so as to run along one side of said belt 41 from the position just below die head 23 through the concerned side of the forming machine lower die 13 to the position a little beyond the forward end of the forming machine 10. In order to guide and drive said chains 51, there are mounted a pair of sprockets 52 for rotation respectively on the side panels of the movable frame 26 at the rear end thereof where said departure roll 42 is journaled, and a pair of sprockets 53 for rotation on a pair of vertically standing posts 34 transversely spaced apart and mounted on the machine base just forward of the forming machine 10. In order to avoid the problem referred to above regarding the endless belt 41, a pair of slack compensation sprockets 54 and a pair of cooperative sprockets 55 are mounted respectively coaxially with said slack compensation roll 44 and with said cooperative roll 45. A pair of driving sprockets 56 are mounted respectively on a pair of said vertical posts 33 to be driven by the prime mover to be explained hereinafter.

Now in reference to FIG. 2, not on the extruder 20 but on the machine base there are mounted an electric motor 61 and a differential gear represented generally by 62 of which input shaft is operatively connected with the output shaft of said motor for instance by the pulley-belt means. The first output shaft of said differential gear 62 is operatively connected, through a reduction gear (not shown in FIG. 2 but explained later in reference to FIG. 5), with a shaft 68 on which a sprocket 69 is fixedly mounted. There is provided a chain 71 for operatively connecting said sprocket 69 with a sprocket 72 and consequently with a pinion 73 coaxially connected with said sprocket 72 to be mounted for rotation on the machine base.

The extruder 20 has a longitudinally extended toothed rack 29 to mesh with said pinion 73 so that when said first output shaft of the differential gear 62 is operated by the motor 61, the extruder 20 may be driven from its advanced position to its retracted position at a speed equal to the extrusion rate.

In order to drive the extruder 20 in the reverse direction, namely from the extracted position to the advanced position, the preferred embodiment of the invention uses a hydrualic piston-cylinder device of which piston rod 81 is fixedly attached to the extruder 20 at the free end thereof while a cylinder 82 is fixedly mounted on the machine base so that a limit switch (not shown) is actuated by the extruder 20 having reached at the retracted position may produce an electric signal which actuates the concerned hydraulic pressure mechanism (not shown) to retract the pulled out piston 81 into the cylinder 82 at a fairly high speed. When the extruder 20 reaches the advanced position, a limit switch (not shown) is actuated to make said hydraulic device 81, 82 neutral or unactivated so that the extruder 20 may be retracted by the motor driven pinion 29 as referred to above. There will be no need for making any further explanation on such hydraulic device and actuation thereof, since the invention does not lie in such matter itself and since persons skilled in the art may readily realize such mechanism in various forms as occasion demands.

The differential gear second output shaft which is driven not by rotation of the output gear but by rotation of the gear case housing therein an input gear, intermediate gears in addition to said output gear of the differential gearing 62 as illustrated in FIG. 4 to be explained hereinafter, is operatively connected by a chain 92 to a sprocket 93 which is mounted for rotation on the machine base. To said sprocket 93, another sprocket 94 and a disk 95 adapted to be braked by an electromagnetic clutch (to be explained later) are coaxially connected so that the motor driving is transmitted from said sprocket 94 by a chain 97 to said sprockets 56 mounted on the posts 33 for driving the sheet gripping clamp chains 51.

Now in reference to FIG. 3, said chain 97 is engaged not directly with said sprocket 56 for driving said sheet gripping clamp chain 51 but with a sprocket 56' coaxially connected therewith. A further pair of sprockets 56" coaxially connected with said clamp chain sprockets 56 are operatively connected by a pair of chains 98 with a pair of sprockets 46' coaxially connected with said endless belt driving roll 46 so that the endless belt 41 for carrying the plastic sheet may be driven completely synchronizedly with a pair of the endless chains 51 to respectively run along the both sides of the running endless belt 41. There will be no need for adding any other explanation in reference to FIG. 3 except that the belt upper run terminates at the roll 43 just rearward of the lower die 13 but the clamp chains 51 run beyond the forming machine die zone to carry the plastic sheet onto the lower die 13 as explained in reference to FIG. 1.

Now in operation made in reference to FIG. 4 and also to FIG. 2, the differential gearing 62 has the input shaft 63 which is operatively connected with the output shaft of the motor 61. In a gear case 64, there are arranged an input gear 62a fixedly mounted on said shaft 63, a pair of intermediate gears 62b each meshing with said gear 62a, and an output gear 62c meshing with each of said intermediate gears 62b. The differential gear case 64 is operatively connected with a gear 65 meshing with a gear 65' which is fixedly mounted on a second output shaft on which the sprocket 91 is fixedly mounted.

Said output gear 62c is fixedly mounted on a first output shaft 66 which is operatively connected with a reduction gear represented generally by 67 which has its output shaft 68 having the sprocket 69 fixedly mounted thereon as illustrated in FIG. 2. The sprocket 69 is drivingly connected by the chain 71 to the sprocket 72 coaxially fixed with the pinion 73 as referred to above. Said pinion 73 meshes with the toothed rack 29 fixedly mounted on the extruder 20. It is preferable to provide two racks 29 in pair arranged to leave transverse space therebetween so as to respectively mesh with a pair of concerned pinions 73 for smoothly driving the extruder 20 along the rails.

Still in reference to FIG. 4, the sprocket 91 to be driven by the second output shaft of the differential gear 62 is operatively connected with a sprocket 93 mounted for rotation on the machine base as referred to in reference to FIG. 2. Said sprocket 93 is coaxially fixed with the sprocket 94 and the brake disk 95 which is adapted to be braked by means of an electromagnetic clutch 96. Said sprocket 94 is operatively connected with the sprockets 56' and 56" coaxially connected with the sprocket 56 by the chain 97 already explained in reference to FIG. 3. It has been explained that said sprocket 56" is operatively connected with the driving sprocket 46' and consequently the driving roll 46 by the chain 98 in reference to FIG. 3 for synchronizedly driving the endless belt 41 and the clamp chains 51.

In operation, now supposing that the extruder 20 is in its advanced position, the limit switch (not shown) is actuated thereby so as to produce the corresponding electric signal.

Said signal is used for actuating the hydraulic devices 14, 14' so as to vertically move the dies 13, 13' to be engaged for molding the articles therebetween from the plastic sheet of the length L having already been supplied to the forming machine 10.

Said signal is used also for energizing the electromagnetic clutch 96 so as to brake the disk 95. Thus, on one hand, the sprocket 93 coaxially fixed therewith and consequently the sprocket 91 operatively connected therewith by the chain 92 are also braked so that the second output shaft operatively connecting said sprocket 91 to the gear case 64 of the differential gear 62 is braked, whereby the motor 61 does not drive said second output shaft but instead drives the first output shaft 66 due to the nature of the differential gearing system of this sort and further by the reason to be explained hereinafter. On the other hand, thus, the sprocket 94 coaxially fixed with said disk on said second output shaft is now not driven and braked so that the sprockets 56 operatively connected with said sprocket 94 through the chain 97 and the sprocket 56' are not driven thereby for driving the concerned sheet clamping chains 51. The sheet carrying belt 41 does not run now when said sprocket 56', which is operatively connected with the belt driving roll 46 through the sprocket 46', the chain 98 and the sprocket 56", is braked and not driven now.

Said electric signal is adapted to actuate the concerned valve of the hydraulic pressure system to neutralize the hydraulic piston-cylinder device 81-82 so as not hinder the rearward movement of the extruder by means of meshing of the toothed racks 29 with the pinions 73.

Since the second output shaft is braked and the first output shaft 66 operatively connected with said pinions 73 through the gearings as referred to above is freed for rotation now as referred to above, the motor output shaft 63 drives the input gear 62a, intermediate gears 62b and output gear 62c which is fixedly mounted on said first output shaft 66 for rotating said pinions 73. Thus, the extruder 20 is retracted at the speed adjusted to be same with the extrusion rate.

During the rearward movement of the extruder 20, the endless belt 41 and the chains 51 are still not only in the unoperated state but also in the braked condition so that the upper runs thereof are forcingly lengthened as the extruder 20 inclusive of the forwardly projected frame 26 is retracted. Said extension of the upper run of said belt 41 and said chains 51 are compensated or made possible by the corresponding shortening of the lower run between the compensation roll 44 on said rearwardly moving frame 26 and the cooperative roll 45 mounted for free rotation on the fixed posts 32, and between the compensation sprockets 54 on said frame 26 and cooperative sprockets 55 on said posts 32, as referred to above in reference to FIG. 1.

The upper runs of said sheet carrying belt 41 and sheet clamping chains 51 are extended naturally same with the rearward movement of the extruder 20 and consequently with the extrusion rate so as to receive the trailing portion of the plastic sheet continuously extruded thereon and therebetween even though the sheet leading portion is now not moved and consequently not fed to the forming machine 10. It is noted that the stroke of the extruder rearward movement is adjusted to be of the distance S, as referred to above, a little shorter than the distance L in view of that the extruder 20 continuously extrudes the plastic sheet still during the rapid forward movement thereof by said hydraulic piston-cylinder device 81, 82.

Now when the extruder 20 reaches its retracted position, the other limit switch (not shown) is actuated thereby so as to produce the concerned electric signal.

Said signal is used for actuating the hydraulic devices 14, 14' to vertically move the dies 13, 13' to be apart from each other so that the formed articles are ejected by the usual means therefor (not shown) so that the separated dies are ready now to receive a new supply of the sheet leading portion of the length L into the molding area thereof.

Said signal is used also for de-energizing the electromagnetic clutch 95 for releasing the disk 95 from braking and making the second output shaft of the differential gear 62 free for rotation and concurrently for actuating the concerned valve of the hydraulic pressure system so as to pull the piston 81 into the cylinder 82.

Thus, the extruder 20 is fairly rapidly advanced so that the pinions 73 are rotated in the reverse direction by the concerned toothed racks 29 fixed to said extruder 20. It will go without saying that when supposing the first output shaft 66 of the differential gear is braked and the second output shaft thereof is left for free rotation the input shaft driving will result in the rotation of said second output shaft. Thus, when the second output shaft 66 is forcingly rotated in the reverse direction by rotation of saif pinions 73, the second output shaft and consequently the sprocket 91 operatively connected therewith through the bevel gears 65, 65' will be rotated at a speed of the input shaft rotation speed plus the first output shaft rotation speed.

The sheet carrying belt 41 and the sheet clamping chains 51 are driven thereby to run at said resultant velocity so as to supply the sheet leading end portion of the length L to the molding area formed between the separated dies 13, 13' while the trailing end portion of the upper runs of the belt 41 and the chains 51 are shortened as the extruder 20 is advanced by the distance of S.

When the extruder 20 is advanced up to said advanced position, the operation referred to above is to be repeated.

What is claimed is:

1. In a plastic extruding and forming apparatus having an extruder operative to continuously extrude plastic material at a predetermined rate and a forming apparatus operative to discontinuously alternately receive and form said plastic material and means for conveying said plastic material between said extruder and saif forming apparatus, the improvement comprising:
   (a) means for moving said extruder toward and away from said forming apparatus;
   (b) said means for moving being operative to move said extruder away from said forming apparatus at a rate equal to said predetermined rate of extrusion;
   (c) said means for conveying being extendably disposed between said extruder and said forming apparatus;
   (d) drive means for driving said means for conveying;
   (e) said drive means being operative to brake the end of said means for conveying nearest said forming apparatus during the motion of said extruder away from said forming apparatus and is further operative to move said means for conveying during the motion of said extruder toward said forming apparatus, said last named motion being at a rate which maintains a speed of said conveying means with respect to said extruder equal to the rate of extrusion; and
   (f) means for synchronizing the motion of said extruder away from said forming apparatus with forming said plastic material, and for synchronizing the motion of said extruder toward said forming apparatus with feeding said plastic material.

2. Apparatus recited in claim 1 wherein said means for conveying comprises:
   (a) an endless belt having upper and lower runs;
   (b) said upper run extending in a substantially plane run between said extruder and said forming apparatus;
   (c) said lower run passing over at least first and second transverse rollers;
   (d) means for translating said first transverse roller with said extruder;
   (e) means for holding the axis of said second transverse roller in a stationary location; and
   (f) said first and second transverse rollers being operative to take up an amount of endless belt equal to the amount of shortening and lengthening of the upper run thereof due to the movement of said extruder with respect to said forming apparatus.

3. Apparatus recited in claim 2 further comprising:
   (a) at least one endless chain disposed adjacent one side of at least said upper run;
   (b) said endless chain extending beyond the end of said endless belt adjacent said forming apparatus; and (c) said endless chain being operative to feed said plastic material into said forming apparatus; and (d) means for driving said endless belt and said endless chain in synchronism with each other.

4. Apparatus recited in claim 1 further comprising:
(a) a motor;
(b) differential gearing having at least first and second output shafts;
(c) said first output shaft being connected to said means for moving; and
(d) said second output being connected to said means for conveying.

5. Apparatus recited in claim 4 further comprising brake means for braking said second output shaft whereby said first output shaft is driven by said differential gearing.

6. Apparatus recited in claim 5 further comprising cylinder means in said means for moving, said cylinder means being operative to move said extruder toward said forming apparatus.

7. Apparatus recited in claim 4 further comprising:
(a) at least one linear rack attached to said extruder;
(b) a pinion engaging said rack; and
(c) means for connecting said first output to said pinion.

8. In an apparatus for forming articles from a thermoplastic sheet comprising a pair of upper and lower dies, means for intermittently and periodically driving said dies to relatively move in the vertical direction between the separated die position for receiving a new supply of the plastic sheet leading length and the engaged die position for molding the articles, and means for conveying the plastic sheet to the molding area formed between said dies actuated synchronizedly with said die driving means, the improvement comprising:

a longitudinally movable extruder having a die head adapted to continuously extrude the plastic sheet at a predetermined extrusion rate, an elongated frame integrally fixed to said extruder so as to project from a position just below said die head toward an opposed die by the distance substantially equal to a length of the plastic sheet necessary for one molding operation to form the articles;

first driving means operatively associated with said extruder for moving the extruder together with said frame forward to the advanced position where the forward end of said fame is just at the rear of the forming machine lower die;

second driving means for moving the extruder together with the frame from said advanced position rearward to the retracted position at the velocity equal to said extrusion rate by the distance a little shorter than said plastic sheet length for one molding;

said plastic sheet conveying means in the form of an endless means having upper and lower runs extended from a departure position below said extruder die head where a guide member therefor is mounted on said frame at the rear end thereof to a terminus position where the necessary plastic sheet length is supplied to the molding dies, the upper runs of said endless means being guided by a plurality of guide members in the stranded condition and the lower runs thereof guided by a plurality of guide members inclusive of means for compensating lengthening or shortening of the upper runs caused by rearward or forward movement of the extruder by correspondingly shortening or lengthening the lower runs thereof;

means for driving said endless means so as to supply said length of the plastic sheet leading portion to the molding dies; and means for synchronizedly actuating said second driving means to rearwardly move the extruder from said advanced position to said retracted position, actuating said die driving means to move said dies from said separated position to said engaged position, and deactivating said endless means driving means to stop the same to run with allowing a part of the upper runs thereof to be lengthened which is compensated by the corresponding shortening of a part of the lower runs thereof, and for synchronized actuating said first driving means to forwardly move the extruder from said retracted position to said advanced position at a higher speed, actuating said die driving means to move the dies from the engaged position to the separated position, and actuating said endless means driving means to drive the same at the speed of said extrusion rate plus said higher extruder forward movement velocity for supplying said length of the plastic sheet leading portion to the molding dies.

9. The apparatus as claimed in claim 8 in which said plastic sheet conveying means comprises;

an endless belt extended around a plurality of guide rolls mounted for rotation inclusive of a departure position roll mounted for rotation on said movable frame at the rear end thereof, a terminus position roll mounted for rotation at the rearward end of the forming machine lower die for carrying the extruded plastic sheet thereon from the extrusion die head to the molding lower die, a first belt length compensation roll mounted for rotation on the movable frame at the forward end thereof so as to guide the belt lower run at the outer surface thereof, and a second belt length compensation roll mounted for rotation on the stationary machine bed below said first roll when the extruder is in the retracted position so that when the extruder is moved forward together with the frame the lower run of the belt is lengthened between said first and second rolls so as to make it possible to correspondingly shorten the upper run of the belt; and a pair of link chains each having a plurality of clamps for gripping the concerned side edge of the plastic sheet and extended around a plurality of guide sprockets mounted for rotation inclusive of a pair of departure position sprockets mounted for rotation on said movable frame at the rear end thereof, a pair of terminus position sprockets mounted for rotation at the forward end of the forming machine lower die for guiding the extruded plastic sheet therebetween from the extrusion die head to the forming machine lower die and further carrying said sheet beyond said lower die to supply the necessary length thereof on said die, a pair of first chain length compensation sprockets mounted for rotation on the movable frame at the forward end thereof so as to guide the chain lowers run at the outer side thereof, and a pair of second chain length compensation sprockets mounted for rotation on the stationary machine bed respectively below said first sprockets when the extruder is in the retracted position so that when the extruder is moved forward together with the frame the chain lower runs are respectively lengthened between said first and second sprockets for making it possible to correspondingly shorten the chain upper runs.

10. The apparatus as claimed in claim 8 in which;
said first driving means is in the form of a hydraulic piston-cylinder device one being fixed to the movable extruder while the other is fixed to a stationary machine bed so that hydraulic actuation thereof may move the extruder at a higher speed to the advanced position but when deactivated the piston and the cylinder may be relatively freely movable;
said second driving means is in the form of a pinion mounted for rotation on the stationary machine bed and an elongated toothed rack mounted longitudinally on the movable extruder for meshing with said pinion so that driving said pinion may move the extruder rearward to the retracted position at a speed same with the extrusion rate;
said means for driving said endless means is in the form of a driving roll and/or sprocket; and
said synchronizedly actuating means comprises an electric motor, a differential gear having an input shaft operatively connected with the electric motor output shaft as well as a first and second output shaft adapted for either one of said shafts to be driven when the other is braked, said second output shaft being operatively connected with said pinion while said first output shaft is operatively connected with said endless means through a disk which is adapted to be electromagnetically braked; whereby first limit means operative when the extruder arrives at the advanced position for electromagnetically braking said disk so as to deactivate said first output shaft and consequently keep said endless means from running, for deactivating said hydraulic piston-cylinder device so as to allow said piston and cylinder to be freely relatively movable and for allowing said second output shaft and consequently said pinion to be driven by the motor so as to move the extruder rearwardly to the retracted position in addition to the purpose for actuation of said die driving means for moving the opposed dies to be separated, and a second limit means operative when the extruder arrives at the retracted position for electromagnetically releasing brake from the disk and for actuating said hydraulic piston-cylinder device so as to move the extruder forward to the advanced position which causes driving of said pinion in the reverse direction meshing with the toothed rack and consequently said second output shaft which in turn causes driving of said first output shaft for making said endless means run at the speed of said extrusion rate plus said higher extruder forward movement velocity in addition to the purpose for actuation of said die driving means for moving the opposed dies to be engaged.

* * * * *